United States Patent Office 3,189,657
Patented June 15, 1965

3,189,657
5-(3-BROMOPROPYLIDENE)DIBENZO-[a,d]
CYCLOHEPTA (1.4)DIENE
Jack Mills, Glenns Valley, Ind., assignor to Eli Lilly and
Company, Indianapolis, Ind., a corporation of Indiana
No Drawing. Filed Nov. 3, 1960, Ser. No. 66,904
1 Claim. (Cl. 260—649)

This in a continuation-in-part of my application Serial No. 10,056, filed February 23, 1960, now abandoned.

This invention relates to novel antidepressive aminoalkyl-substituted tricyclic hydrocarbons.

The compounds provided by this invention are known generically as 5-(3-aminopropylidene)dibenzo[a,d]cyclohepta[1.4]-dienes. They can be represented by the following formula:

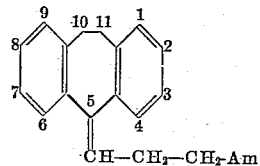

wherein Am is

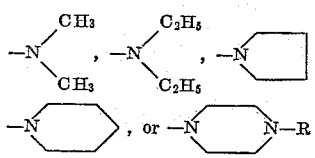

and in which R is methyl, ethyl, hydroxyethyl or allyl. A preferred group of compounds is that in which Am represents dimethylamino, pyrrolidino and 4-methylpiperazino. Also included within the scope of this invention are the nontoxic pharmaceutically acceptable acid addition salts of amine bases represented by the above formula.

The amine bases of this invention are high-boiling viscous oils which crystallize slowly at ambient room temperature. Ultraviolet absorption spectra of the amine bases in ethanol solution show an absorption maximum at about 238 m$\mu$. This absorption maximum is attributed to the presence of an unsymmetrical diphenylethylene grouping in the molecule. The nontoxic pharmaceutically acceptable acid addition salts of the above amine bases are white crystalline solids soluble in most highly polar oxygenated solvents, as for example, ethanol, acetone, water and the like.

The compounds of this invention are prepared in accordance with the following reaction sequence.

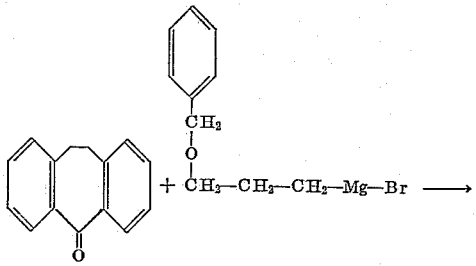

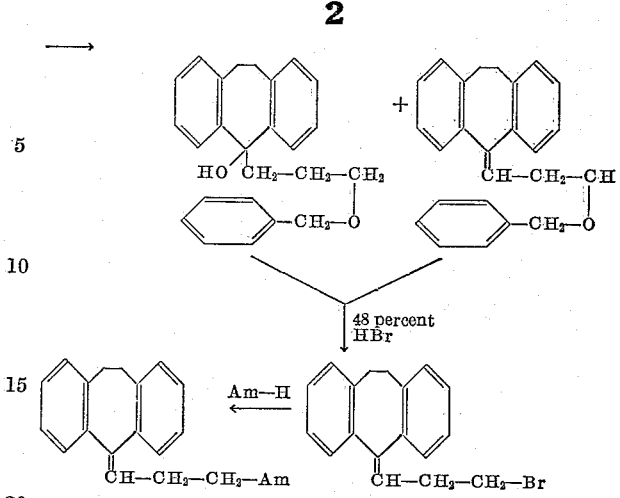

wherein Am has the same significance as hereinabove.

In the above reaction sequence, a 3-benzyloxypropyl Grignard reagent is reacted with 5-keto-dibenzo[a,d]cyclohepta-[1.4]diene [prepared by the method of Cope and Fenton, J. Am. Chem. Soc. 73, 1673 (1951)] to form a tertiary alcohol having a 3-benzyloxypropyl group attached to the carbon atom also carrying the tertiary alcohol group. In isolating the products of the Grignard reaction, during which isolation procedure dilute acid is used to decompose the organo-metallic compounds present, a large percentage of the tertiary alcohol initially formed is dehydrated to yield 5-(3-benzyloxypropylidene)dibenzo[a.d]cyclohepta[1.4]diene. Both the propylidene compound and any remaining tertiary alcohol are recovered as ether extracts. These extracts are separated and the ether removed by evaporation in vacuo. The resulting oily residue is treated with 48 percent aqueous hydrobromic acid. This treatment serves not only to substitute a bromine atom for the benzyloxy group attached to the propyl side chain of the molecule, but also dehydrates any remaining tertiary alcohol to yield a propylidene compound. The product of the hydrobromic acid treatment is, therefore, a single substance, 5-(3-bromopropylidene)dibenzo[a,d]cyclohepta[1.4]diene.

This compound is reacted with the desired secondary amine, for example, dimethylamine, diethylamine, pyrrolidine, piperidine, 4-methylpiperazine, 4-ethylpiperazine, 4-allylpiperazine and the like, to produce the compounds of this invention. The reaction is carried out simply by heating a mixture of the secondary amine and the bromopropylidene derivative for a period of a few hours. If the secondary amine is a volatile amine such as dimethylamine, the reaction is preferably carried out in a sealed vessel.

The tertiary amino compounds of this invention thus prepared are isolated and purified by methods well known to the art, as for example, by pouring the reaction mixture into dilute acid, extracting with ether to remove unreacted starting materials, making the acidic aqueous layer basic, extracting the free bases thus formed into ether, separating the ether layer and evaporating the ether and unreacted secondary amine starting material, leaving the desired tertiary amine as a residue.

The nontoxic pharmaceutically acceptable acid addition salts of the amine bases prepared by the above procedure are formed by dissolving the amine base in a suitable solvent, and adding an equimolar amount of the acid. If a solvent such as ether is used in which solvent most acid addition salts of amines are insoluble, the insoluble acid addition salt can be isolated by filtration or by centrifugation. If on the other hand, a solvent such as an alcohol is used, in which the acid addition salt of the amine is soluble, the acid addition salt is isolated by evaportion of the solvent in vacuo. When a volatile acid such as hydrogen chloride is employed to prepare an acid addition salt, an excess of the acid is usually used since the excess is easily removed by evaporation. The compounds of this invention conveniently in the form of their pharmaceutically acceptable acid addition salts have a pharmacologic activity which makes them useful in the treatment of mental diseases, especially in the treatment of various depressive states. In particular, 5-(3-dimethylaminopropylidene) dibenzo [a,d] cyclohepta [1.4]diene, either as the free base or as a pharmaceutically acceptable acid addition salt, is highly effective in combatting depression in man.

Among the nontoxic pharmaceutically acceptable acids which can form salts with the amine bases of this invention are the following: hydrochloric acid, sulfuric acid, hydrobromic acid, maleic acid, tartaric acid, phosphoric acid, succinic acid, benzoic acid and the like.

This invention is further illustrated by the following specific example.

EXAMPLE 1

*Preparation of 5-(3-bromopropylidenedibenzo[a,d] cyclohepta[1.4]diene*

A Grignard reagent is prepared from 0.2 mole of 3-benzyloxypropylbromide and 0.22 mole of magnesium in 200 ml. of ether. 0.1 mole of 5-keto-dibenzo[a,d]cyclohepta[1.4]diene is added to the Grignard reagent. After the addition has been completed, the reaction mixture is allowed to remain at ambient room temperature for about 14 hours. The reaction mixture is poured into an excess of 12 N hydrochloric acid diluted about ten to one with ice, to decompose the organo-metallic reaction products. The ether layer, containing a mixture of 5-(3-benzyl-oxypropylidene)dibenzo[a,d]cyclohepta[1.4]diene and 5-(3-benzyloxypropyl) - 5 - hydroxydibenzo [a,d] cyclohepta [1.4]diene, is separated, the aqueous layer is extracted with 200-ml. portions of ether, and the original ether solution and the ether extract are combined and are dried over anhydrous magnesium sulfate. The ether is removed by evaporation in vacuo. 200 ml. of 48 percent aqueous hydrobromic acid are added to the resulting oily residue and the mixture is heated at refluxing temperature for about 3 hours to replace the benzyloxy group of 5-(3-benzyloxypropylidene) dibenzo[a,d]cyclohepta[1.4]diene with a bromine atom. The reaction mixture is diluted with 1000 ml. of water, and 1000 ml. of ether are added to dissolve the bromo compound. The ethereal layer is separated and is washed alternately with 100-ml. portions of a saturated sodium bicarbonate solution and of water until the water wash is no longer acid to litmus. The ether layer is separated and dried, and the ether is removed therefrom by distillation in vacuo. 5-(3-bromopropylidene)dibenzo[a,d]cyclohepta[1.4]diene formed in the above reaction is purified by distillation. The compound boils at about 155–165° C. at a pressure of about 0.5 mm. of mercury; $n_D^{25}$=1.627.

*Analysis.*—Calc.: Br, 25.15. Found: Br, 25.45.

EXAMPLE 2

*Preparation of 5-(3-dimethylaminopropylidene)dibenzo [a,d]cyclohepta[1.4]diene*

3 g. of 5-(3-bromopropylidene)dibenzo[a,d]cyclohepta-[1.4]diene is mixed with 12 g. of dimethylamine in an autoclave. The autoclave is heated to about 120° C. for 4 hours. After cooling, the reaction mixture is poured into 50 ml. of 10 percent sodium hydroxide and 200 ml. of ether. 5-(3-dimethylaminopropylidene)dibenzo[a,d] cyclohepta[1.4]diene formed in the above reaction, being insoluble in the alkaline layer, dissolves in the ether layer. The ether layer is separated, washed with three 100-ml. portions of water, and dried. The ether is removed by evaporation in vacuo. The residue comprising 5-(3-dimethylaminopropylidene) - dibenzo[a,d]cyclohepta[1.4]diene is redissolved in ether and the ethereal solution is saturated with anhydrous gaseous hydrogen chloride. 5-(3 - dimethylaminopropylidene)dibenzo[a,d]cyclohepta[1.4]diene hydrochloride thus formed, being insoluble in ether, precipitates. The precipitate is separated by filtration. Threefold recrystallization of the precipitate from a mixture of ether and ethanol yields purified 5-(3-dimethylaminopropylidene) dibenzo[a,d]cyclohepta[1.4] diene hydrochloride melting at about 192–193° C.

*Analysis.*—Calc.: Cl, 11.30. Found: Cl, 11.17.

An ultraviolet absorption spectrum of 5-(3-dimethylaminopropylidene)dibenzo[a,d]cyclohepta[1.4] diene in ethanol shows an absorption maximum at 238.5 mµ with the following molar extinction coefficient: Eo=14,340.

5 - (3-diethylaminopropylidene)dibenzo[a,d]cyclohepta[1.4]diene is prepared by substituting diethylamine for dimethylamine in the above procedure.

EXAMPLE 3

*Preparation of 5-(3-pyrrolidinopropylidene)dibenzo [a,d]cyclohepta[1.4]diene*

The procedure of Example 2 is followed except that the reaction mixture comprising 3 g. of 5-(3-bromopropylidene)dibenzo[a,d]cyclohepta[1.4]diene and 12 g. of pyrrolidine is heated in a reaction flask under total reflux at 110° C. for about 4 hours. Following the procedure outlined in Example 2, 5-(3-pyrrolidino-propylidene)dibenzo[a,d]cyclohepta[1.4]diene formed in the above reaction is isolated as the free base, and the free base is converted to the hydrochloride salt. 5-(3-pyrrolidinopropylidene) - dibenzol[a,d]cyclohepta[1.4]diene hydrochloride thus prepared is recrystallized from a mixture of ether and ethanol. The recrystallized salt decomposes at about 178° C.

*Analysis.*—Calc.: Cl, 10.40. Found: Cl, 10.42.

An ultraviolet absorption spectrum of 5-(3-pyrrolidinopropylidene)dibenzo[a,d]cyclohepta[1.4]diene shows an absorption maximum at 238 mµ having a molar extinction coefficient as follows: Eo=14,350.

5 - (3 - piperidinopropylidene)dibenzo[a,d]cyclohepta [1.4]diene is prepared by substituting piperidine for pyrrolidine in the above synthetic procedure.

EXAMPLE 4

*Preparation of 5-[3-(4-methylpiperazino)propylidene] dibenzo[a,d]cyclohepta[1.4]diene*

The procedure of Example 2 is followed except that the reaction mixture comprising 3 g. of 5-(3-bromopropylidene)dibenzo[a,d,]cycloheptal[1.4]diene and 12 g. of 4-methylpiperazine is heated at 110° C. Following the procedure outlined in Example 2, 5-[3-(4-methylpiperazino)propylidene]dibenzo[a,d]cyclohepta[1.4]diene is isolated as the free base, and the free base is converted to the dihydrochloride salt. 5-[3-(4-methylpiperazino) propylidene[dibenzo[a.d]cycloheptal[1.4]diene hydrochloride thus prepared is recrystallized from a mixture of ethanol and ether. The purified crystals decompose at about 269° C.

*Analysis.*—Calc.: Cl, 17.5. Found: Cl, 17.22.

An ultraviolet absorption spectrum of

5-[3-(4-methylpiperazino)propylidene]dibenzo(a,d] cyclohepta[1.4]diene shows absorption maximum at 238.5 mµ having a molar extinction coefficient as follows: Eo=13,500.

5 - [3-(4-ethylpiperazino)propylidene]dibenzo[a,d]cyclohepta[1.4]diene and 5-[3-(4-allylpiperazino)propylidene]dibenzo[a,d]cyclohepta[1.4]diene are prepared by substituting 4-ethylpiperazine and 4-allylpiperazine for 4-methylpiperazine in the above synthetic procedure.

EXAMPLE 5

*Preparation of 5-[3-(4-hydroxyethylpiperazino)-propylidene]dibenzo[a,d]cyclohepta[1.4]diene*

The procedure of Example 2 is followed except that 4-hydroxyethylpiperazine and 5-(3-bromopropylidene)dibenzo[a,d]cyclohepta[1.4]diene are heated together. 5 - [3-(4-hydroxyethylpiperazino)propylident]dibenzo[a,d]cyclohepta[1.4]diene thus prepared is isolated as the dihydrochloride salt, which melts at about 262–263° C. with decomposition.

*Analysis.*—Calc.: C, 65.9; H, 7.38. Found: C, 66.09; H, 7.36.

5 - [3 - (4 - hydroxyethylpiperazino)propylidene]dibenzo[a,d]cyclohepta[1.4]diene has an absorption maximum in the ultraviolet at about 238.5 m$\mu$.

In pharmacological tests, 5-[3-(4-hydroxyethylpiperazino)propylidene]dibenzol[a,d]cyclohepta[1.4]diene has demonstrated an interesting antihistaminic activity.

I claim:

5 - (3 - bromopropylidene)dibenzo[a,d]cyclohepta[1.4]diene.

References Cited by the Examiner

UNITED STATES PATENTS

| | | | |
|---|---|---|---|
| 2,914,528 | 11/59 | Craig | 260—268 X |
| 3,000,898 | 9/61 | Hoffmann et al. | 260—247.5 |
| 3,073,847 | 1/63 | Doebel et al. | 260—268 X |
| 3,074,931 | 1/63 | Craig | 260—268 |
| 3,116,291 | 12/63 | Petersen et al. | 260—268 X |
| 3,126,411 | 3/64 | Ray-Bellet et al. | 260—268 X |

OTHER REFERENCES

Rigaudy et al.: Academic des Sciences Comptes Rendus, pages 1528–1540 (1959).

Winthrop et al.: Journal of Organic Chemistry, vol. 27, pp. 230–234 (1962).

NICHOLAS S. RIZZO, *Primary Examiner.*

IRVING MARCUS, CHARLES B. PARKER, WALTER A. MODANCE, *Examiners.*